(12) United States Patent
Mizuno et al.

(10) Patent No.: US 11,620,905 B2
(45) Date of Patent: Apr. 4, 2023

(54) INFORMATION PROCESSING APPARATUS, INFORMATION PROCESSING METHOD, AND SYSTEM

(71) Applicant: TOYOTA JIDOSHA KABUSHIKI KAISHA, Toyota (JP)

(72) Inventors: Yuko Mizuno, Nagoya (JP); Misa Ejiri, Nagoya (JP); Kazuyuki Kagawa, Nisshin (JP); Yuta Oshiro, Nagoya (JP); Katsuhito Kito, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 88 days.

(21) Appl. No.: 17/194,957

(22) Filed: Mar. 8, 2021

(65) Prior Publication Data
US 2021/0280063 A1 Sep. 9, 2021

(30) Foreign Application Priority Data
Mar. 9, 2020 (JP) ............................. JP2020-039959

(51) Int. Cl.
*G06Q 10/02* (2012.01)
*G08G 1/14* (2006.01)

(52) U.S. Cl.
CPC ............ *G08G 1/149* (2013.01); *G06Q 10/02* (2013.01); *G08G 1/142* (2013.01); *G08G 1/148* (2013.01)

(58) Field of Classification Search
CPC ...................................................... G08G 1/149
See application file for complete search history.

(56) References Cited

U.S. PATENT DOCUMENTS

| 2015/0066545 A1* | 3/2015 | Kotecha | G06Q 10/02 |
| | | | 705/5 |
| 2016/0240083 A1* | 8/2016 | Chinomi | G06Q 10/02 |
| 2018/0111492 A1* | 4/2018 | McCool | B60L 53/38 |
| 2018/0218605 A1* | 8/2018 | Mowatt | G08G 1/144 |
| 2018/0350157 A1* | 12/2018 | Koreishi | G07B 15/02 |

FOREIGN PATENT DOCUMENTS

| CN | 108009604 A | 5/2018 |
| JP | 2002-175374 A | 6/2002 |

* cited by examiner

*Primary Examiner* — Joseph H Feild
*Assistant Examiner* — Pameshanand Mahase
(74) *Attorney, Agent, or Firm* — Sughrue Mion, PLLC

(57) ABSTRACT

The present disclosure allows more effective exploitation of a vacant parking space in a parking lot. A controller of a management server that is an information processing apparatus according to the present disclosure performs accepting a utilization request of a parking space from an apparatus of a utilization applicant, providing information on a service that is available besides parking in the parking space to the apparatus of the utilization applicant, the utilization request being accepted by the apparatus, and accepting a response conveying a request to utilize the service from the apparatus of the utilization applicant.

17 Claims, 7 Drawing Sheets

INFORMATION PROCESSING APPARATUS, INFORMATION PROCESSING METHOD, AND SYSTEM

CROSS REFERENCE TO THE RELATED APPLICATION

This application claims the benefit of Japanese Patent Application No. 2020-039959, filed on Mar. 9, 2020, which is hereby incorporated by reference herein in its entirety.

BACKGROUND

Technical Field

The present disclosure relates to an information processing apparatus, an information processing method, and a system.

Description of the Related Art

There is proposed a parking lot management system for reserving a parking lot via the Internet (see, for example, Patent document 1).

CITATION LIST

Patent Document

[Patent document 1] Japanese Patent Laid-Open No. 2002-175374

SUMMARY

One or more aspects of the present disclosure are directed to allow more effective exploitation of a vacant parking space in a parking lot.

One aspect of an embodiment of the present disclosure may be exemplified by an information processing apparatus including a controller including at least one processor. The controller may perform accepting a utilization request of a parking space from an apparatus of a utilization applicant, providing information on a service that is available besides parking in the parking space to the apparatus of the utilization applicant, the utilization request being accepted by the apparatus, and accepting a response conveying a request to utilize the service from the apparatus of the utilization applicant. Another aspect of the embodiment of the present disclosure may be exemplified by an information processing method to be performed by at least one computer, such as the information processing apparatus. Still another aspect of the embodiment of the present disclosure may be exemplified by a system including the at least one computer, such as the information processing apparatus.

According to the above-described information processing apparatus, it is possible to more effectively exploit a vacant parking space in a parking lot.

DESCRIPTION OF THE EMBODIMENTS

The embodiment of the present disclosure may illustrate an information processing apparatus including a controller. The controller may perform accepting a utilization request of a parking space from an apparatus of a utilization applicant which desires parking lot utilization, providing information on a service that is available besides parking in the parking space to the apparatus of the utilization applicant, the utilization request being accepted by the apparatus, and accepting a response conveying a request to utilize the service from the apparatus of the utilization applicant.

The information processing apparatus may accept information on a vacant parking space from an apparatus of a parking lot provider and store the information in a memory. The information processing apparatus may also accept information on the service from an apparatus of a provider that provides a service available in a parking space, and store the information in the memory. When the information processing apparatus accepts a utilization request of a parking space from an apparatus of a utilization applicant, the information processing apparatus may provide information on a service that is available besides parking in the parking space to the apparatus of the utilization applicant. The service may be selected in accordance with a utilization status or a reservation status of another parking space associated with the parking space. Alternatively, the service may be selected in accordance with a past experience in service utilization of the utilization applicant or a person different from the utilization applicant. Alternatively, the service may be selected in accordance with a time slot desired for parking space utilization by the utilization applicant. The information processing apparatus may perform accepting a response conveying a request to utilize the service from the apparatus of the utilization applicant. Upon the acceptance, the information processing apparatus can instruct the apparatus of the provider that provides the service, for which the response is accepted, to provide the service to the utilization applicant. The above-described processing allows the information processing apparatus to more effectively exploit a vacant parking space in a parking lot.

The information processing apparatus according to the embodiment of the present disclosure, an information processing method by the controller in the information processing apparatus, and a system including the information processing apparatus will be described below with reference to the drawings.

Figure 1:
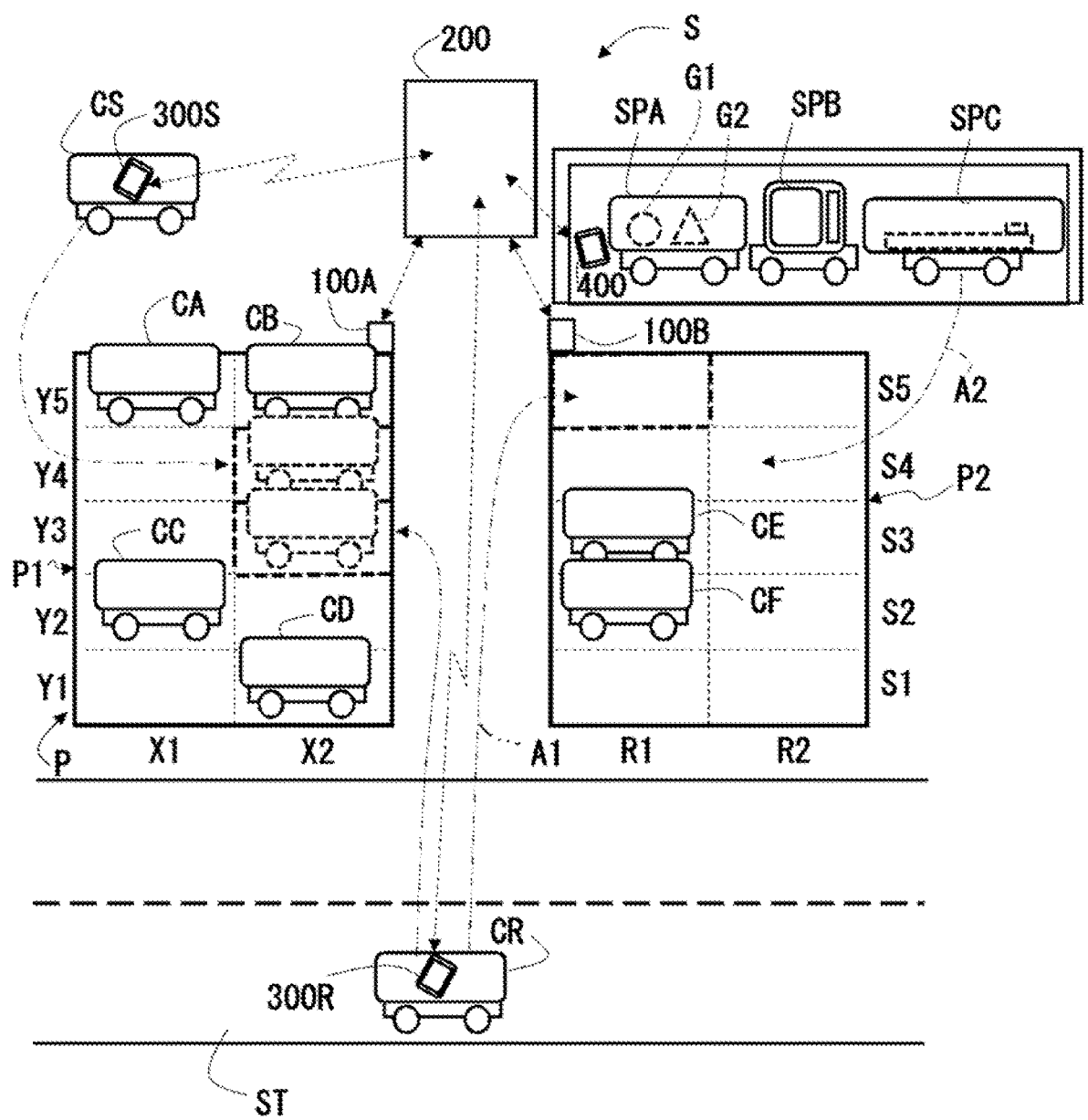
FIG. 1 is a conceptual diagram in a given scene of a system according to an embodiment of the present disclosure.

FIG. 1 conceptually illustrates a system S according to the embodiment of the present disclosure. FIG. 1 conceptually illustrates one scene in the system S. The system S can also be called a parking lot management system.

The system S includes a management server 200 as an information processing apparatus which cooperates with parking lot apparatuses 100 (100A, 100B, . . . ) as apparatuses of providers of parking spaces in parking lots, i.e., parking lot providers. The parking lot apparatuses 100 may be, for example, mobile terminals of the parking lot providers but are apparatuses which are installed adjacent to parking lots P (P1, P2, . . . ) here.

The parking lot apparatus 100 is an information processing apparatus, and accepts a parking reservation for a parking space in the parking lot P and performs processing corresponding to utilization of the parking space. For example, the parking lot apparatus 100 accepts a desire for utilization of a parking space in the parking lot P from a user apparatus 300 (300A, . . . ) of a user and performs a process of receiving payment of a fee for utilization and other processes.

Here, the parking lot apparatus 100 accepts a reservation for utilization of a parking space for a predetermined period or a longer period. For example, the parking lot P is a parking lot near a station, an airport, or a port. If a user goes on a long-term trip, the user can reserve, in advance, a parking space where a vehicle of the user is to be parked and utilize the parking space. For example, the user communicates with the parking lot apparatus 100 and reserves a parking space that the parking lot apparatus 100 manages utilization, i.e., rental of the parking space, through the user apparatus 300 before a predetermined due date for utilization (e.g., up to one day before a utilization start date and time). A user can make a reservation here only when the user desires to utilize a parking space for one week or a longer period in succession. The parking lot apparatus 100 allows a user to reserve, in advance, a parking space in an associated parking lot under the reservation-restrictive stipulation and utilize the parking space. Note that the reservation-restrictive stipulation is illustrative only and that such a reservation-restrictive stipulation may not be made.

For parking spaces in the parking lot P which are not utilized under the reservation-restrictive stipulation, the parking lot apparatus 100 cooperates with the management server 200 in order to promote utilization of the parking spaces. The management server 200 can accept registration of a vacant parking space from the parking lot apparatus 100 and allow various types of users to utilize the parking space on an hourly basis (e.g., on a one-hour basis). Note that the management server 200 can also accept, for example, a registration that allows utilization of a parking lot at a user's home during a predetermined time slot (e.g., from 9 a.m. to 5 p.m.) through the parking lot apparatus 100. The management server 200 allows a user (also referred to as a utilization applicant) which is a potential parking lot utilizer to refer to information on a registered parking space. For example, the management server 200 distributes a list of registered parking spaces or the like or posts the list or the like on a particular site. The management server 200 communicates with the user apparatus 300 of a user, accepts a utilization request from the user, identifies or selects a parking space to be utilized, and assigns the parking space.

The management server 200 includes information on a service which is available besides parking in a parking space registered as described earlier. The management server 200 allows a user to refer to the information on the service, i.e., provides the information. When the management server 200 accepts a response conveying a request to utilize the service from the user, the management server 200 makes the service available to the user. Note that the management server 200 also performs adjustment at this time such that a parking space to be utilized by the user fits the service as needed.

Information on a service stored in the management server 200 is provided from an apparatus of a provider which provides the service (hereinafter referred to as a service provider) to the management server 200. The service provider provides information on one or a plurality of services from an apparatus (hereinafter referred to as a service apparatus) 400 of the service provider to the management server 200. When a user, i.e., a utilization applicant requests for service utilization and decides on a service to be utilized, the management server 200 transmits information for instructing the service apparatus 400 to provide the service to the user.

Here, the parking lot apparatus 100, the management server 200, the user apparatus 300, and the service apparatus 400 can cooperate via a network N. Respective configurations of the parking lot apparatus 100, the management server 200, the user apparatus 300, and the service apparatus 400 will be described below.

Figure 2:
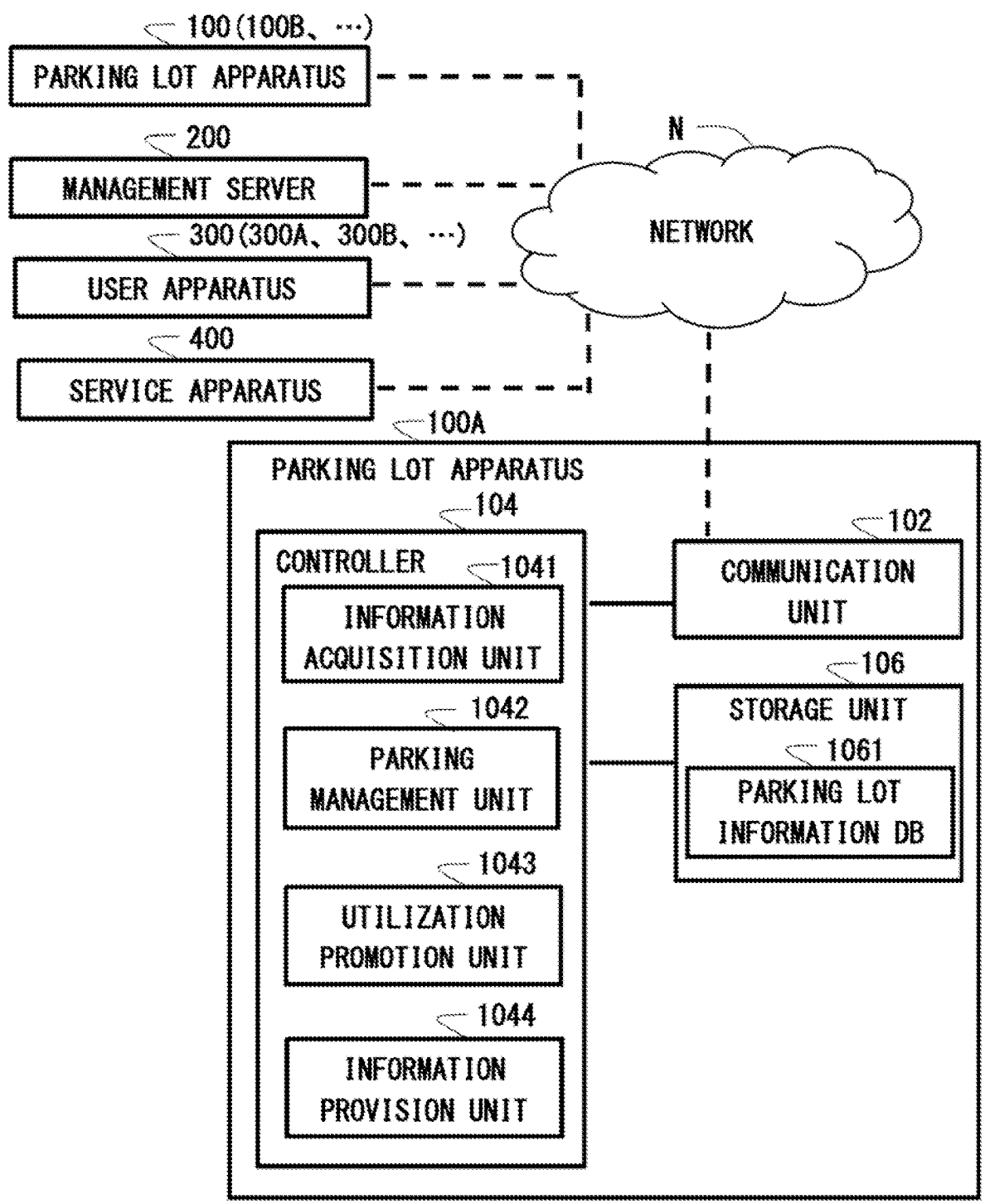
FIG. 2 is a block diagram schematically illustrating a configuration of the system in FIG. 1 and is a diagram particularly illustrating a configuration of a parking lot apparatus.

A block diagram schematically illustrating a relationship among the parking lot apparatus 100, the management server 200, the user apparatus 300, and the service apparatus 400 is illustrated in FIG. 2. FIG. 2 illustrates a configuration of the parking lot apparatus 100A that is related to the parking lot P1 in FIG. 1 as one example of the parking lot apparatus 100. The other parking lot apparatuses 100 (100B, . . . ) also include the configuration to be described below. Note that although the parking lot apparatus 100A is related to the parking lot P1, and the parking lot apparatus 100B is related to the parking lot P2 here, one parking lot apparatus may be related to, for example, a plurality of parking lots. Although the parking lot apparatus 100 is provided for each of the parking lots P1 and P2, the number of parking lot apparatuses 100 is not limited to this. Although the two parking lots P1 and P2 are illustrated in FIG. 1, the number of parking lots related to the system S may be one, or three or more. The number of parking lot apparatuses 100 in the system S may be one, or two or more.

The parking lot apparatus 100A is an information processing apparatus, as described earlier. The parking lot apparatus 100A is configured to include a communication unit 102, a controller 104, and a storage unit 106.

The communication unit 102 includes communication means for connecting the parking lot apparatus 100A to the network N. Although the parking lot apparatus 100A is configured to be capable of communication with each of the management server 200 and the user apparatus 300 in the present embodiment, the parking lot apparatus 100A may be capable of communication with another apparatus, such as the service apparatus 400 or a service providing vehicle (to be described later).

The controller 104 is a device, i.e., a computer that executes processing in the parking lot apparatus 100A on the basis of information acquired via the communication unit 102. The controller 104 is one example of control means of the parking lot apparatus 100A.

The controller 104 includes a CPU and a main storage unit, and executes an information process in accordance with a program. The CPU is also referred to as a processor. The main storage unit in the controller 104 is one example of a main memory. The CPU in the controller 104 executes a computer program which is executably developed in the main storage unit and provides various types of functions. The main storage unit in the controller 104 stores the computer program to be executed by the CPU and/or data and the like. The main storage unit of the controller 104 is a Dynamic Random Access Memory (DRAM), a Static Random Access Memory (SRAM), a Read Only Memory (RCM), or the like.

The controller 104 is connected to the storage unit 106. The storage unit 106 is a so-called external storage unit, is used as a storage area which assists the main storage unit of the controller 104, and stores a computer program to be executed by the CPU of the controller 104 and/or data and the like. The storage unit 106 is a hard disk drive, a Solid State Drive (SSD), or the like.

The controller 104 includes, as functional modules, an information acquisition unit 1041, a parking management unit 1042, a utilization promotion unit 1043, and an information provision unit 1044. The functional modules are each implemented when the programs (program) stored in the main storage unit and/or the storage unit 106 are (is) executed by the controller 104, i.e., the CPU thereof.

The information acquisition unit 1041 acquires a desire for utilization of a parking space in the parking lot P, i.e., information on a parking reservation from the user apparatus 300 of a user. The information acquisition unit 1041 transmits the information on the parking reservation to the parking management unit 1042. The information on the parking reservation can include a start date and time and a period desired for parking space utilization and/or vehicle information (e.g., identification information, such as a license plate number) in addition to user identification information (e.g., an identification ID and contact information of the user apparatus 300). Note that the information on the parking reservation may include information for identification of a parking space, such as the parking space is which parking space and which parking lot, and includes the information here.

For example, labels for parking space identification are assigned to the parking lots P1 and P2 illustrated in FIG. 1. Each parking space in the parking lot P1 can be identified by (X,Y), as illustrated in FIG. 1. Note that X represents either X1 or X2 and that Y represents any one of Y1 to Y5. For example, a vehicle CA is parked in a parking space (X1,Y5). Similarly, each parking space in the parking lot P2 can be identified by (R,S), as illustrated in FIG. 1. Note that R represents either R1 or R2 and that S represents any one of S1 to S5. A user views, for example, a display as illustrated in FIG. 1 of the parking lots P1 and P2, inputs information (e.g., (X2,Y3)) for identification of a desired vacant parking space together with a start date and time and a period desired for parking lot utilization, and transmits the information, the start date and time, and the period to the parking lot apparatus 100A via the user apparatus 300. The information acquisition unit 1041 acquires such information on a parking reservation and transmits the information to the parking management unit 1042. Note that the parking lot P1 faces a road ST at parking spaces indicated by Y1 and that the parking lot P2 faces the road ST at parking spaces indicated by S1.

The parking management unit 1042 performs a process of reserving a parking space in a parking lot which the parking management unit 1042 manages on the basis of information on a parking reservation. For example, when information on a parking reservation is intended to reserve a parking space (X2,Y3), the parking management unit 1042 updates information in a parking lot information database 1061 so as to reserve the parking space (X2,Y3) in the parking lot information database 1061 in the storage unit 106. Information on vacant parking spaces in the parking lot P1 is reflected in the parking lot information database 1061. The parking management unit 1042 transmits information on the parking space, for which reservation acceptance is completed, to the user apparatus 300 as a parking reserver via the information provision unit 1044. Note that the parking management unit 1042 can also execute other processes related to the parking reservation. For example, the parking management unit 1042 may execute, e.g., a process of receiving payment of a fee for utilization of the reserved parking space.

The utilization promotion unit 1043 reads the information on vacant parking spaces in the parking lot P1 from the parking lot information database 1061 in the storage unit 106 and transmits the information to the information provision unit 1044 such that the information is provided to the management server 200. For example, as described above, a parking space, utilization of the parking space being managed by the parking lot apparatus 100A, can be reserved by a user communicating with the parking lot apparatus 100A through the user apparatus 300 and transmitting information as described above on a parking reservation before a predetermined due date for utilization (e.g., up to one day before a utilization start date and time). For this reason, the utilization promotion unit 1043 transmits the information on vacant parking spaces to the management server 200 so as to promote utilization of a vacant parking space within one day after the transmission to the management server 200. For example, pieces of information, (X1, Y1), (X1, Y3), (X1, Y4), (X2, Y2), (X2,Y3), and (X2,Y4), are transmitted as information on vacant spaces in the parking lot P1 at a time illustrated in FIG. 1. Note that transmission of information on vacant parking spaces in the parking lot P1 by the utilization promotion unit 1043 may be executed at predetermined time intervals (e.g., intervals of one hour) or may be executed each time the parking lot information database 1061 is updated.

The information provision unit 1044 transmits, to the user apparatus 300, information on completion of reservation acceptance transmitted from the parking management unit 1042. The information provision unit 1044 also transmits, to the management server 200, information on vacant parking spaces in the parking lot P1 transmitted from the utilization promotion unit 1043.

The management server 200 in the system S will be described.

Figure 3:
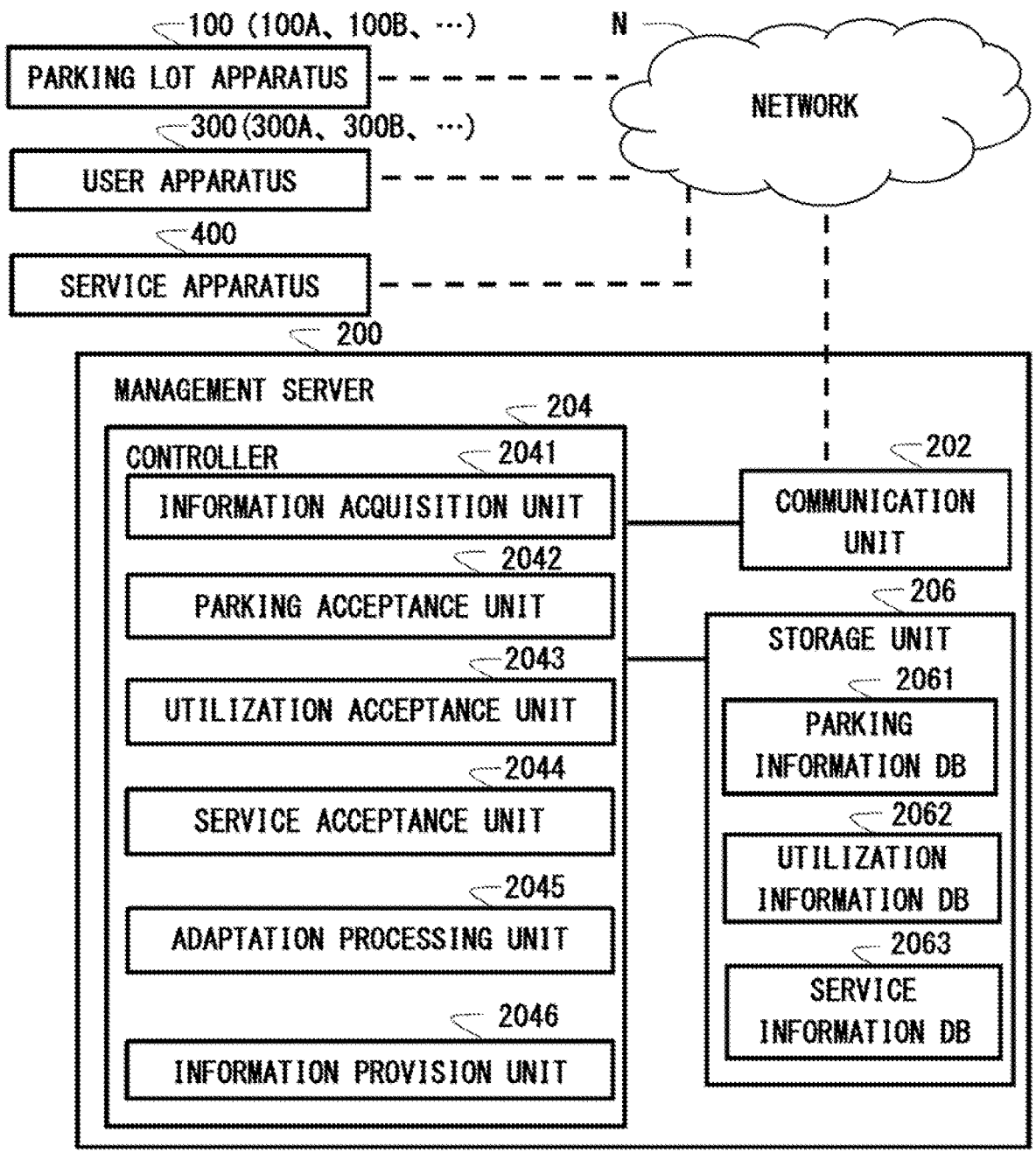
FIG. 3 is a block diagram schematically illustrating the configuration of the system in FIG. 1 and is a diagram particularly illustrating a configuration of a management server.

The management server 200 is an information processing apparatus, as described earlier, and is configured to include a communication unit 202, a controller 204, and a storage unit 206, as illustrated in FIG. 3. The communication unit 202 is the same as the communication unit 102 and includes a communication function for connecting the management server 200 to the network N. The communication unit 202 of the management server 200 is a communication interface for communication with the parking lot apparatus 100, the user apparatus 300, and the service apparatus 400 via the network N. The controller 204 includes a CPU and a main storage unit like the controller 104, and executes an information process by a program. The CPU is, of course, a processor, and the main storage unit of the controller 204 is one example of a main memory. The CPU in the controller 204 executes a computer program which is executably developed in the main storage unit and provides various types of functions. The main storage unit in the controller 204 stores the computer program to be executed by the CPU and/or data and the like. The main storage unit in the controller 204 is a DRAM, an SRAM, a RCM, or the like.

The controller 204 is connected to the storage unit 206. The storage unit 206 is an external storage unit, is used as a storage area which assists the main storage unit of the controller 204, and stores a computer program to be executed by the CPU of the controller 204 and/or data and the like. The storage unit 206 is a hard disk drive, an SSD, or the like.

The controller 204 is means that is responsible for control of the management server 200. The controller 204 includes, as functional modules, an information acquisition unit 2041, a parking acceptance unit 2042, a utilization acceptance unit 2043, a service acceptance unit 2044, an adaptation processing unit 2045, and an information provision unit 2046, as illustrated in FIG. 3. The functional modules are each implemented when the programs (program) stored in the main storage unit and/or the storage unit 206 are (is) executed by the CPU of the controller 204.

The information acquisition unit 2041 acquires various types of information from the parking lot apparatus 100, the user apparatus 300, the service apparatus 400, and the like. The information acquisition unit 2041 transmits the acquired pieces of information to the parking acceptance unit 2042 and the like. More specifically, the information acquisition unit 2041 transmits, to the parking acceptance unit 2042, information acquired from the parking lot apparatus 100. The information acquisition unit 2041 transmits, to the utilization acceptance unit 2043, information acquired from the user apparatus 300. The information acquisition unit 2041 transmits, to the service acceptance unit 2044, information acquired from the service apparatus 400.

The parking acceptance unit 2042 stores, in a parking information database 2061 in the storage unit 206, information acquired via the information acquisition unit 2041, i.e., information on vacant parking spaces in the parking lot P. At this time, the information on vacant parking spaces (e.g., each vacant parking space is which parking space and which parking lot P, and from what time to what time hours available for parking are) is stored in the parking information database 2061 in accordance with a predetermined rule. Note that to what time hours available for parking for each parking space are is also stored here when the parking information database 2061 is updated. For example, when a parking space which was vacant one hour before is reserved for utilization by the update this time and is no longer a vacant parking space, hours available for parking for the parking space are from the update this time to 23 hours later.

The utilization acceptance unit 2043 acquires, i.e., accepts a utilization request from the user apparatus 300 which is acquired via the information acquisition unit 2041 and stores information of the utilization request in a utilization information database 2062 in the storage unit 206. The information of the utilization request can include information, such as the information of the utilization request is for which parking space and for which parking lot P utilization request, and from what time to what time hours desired for utilization are. Note that, when the utilization acceptance unit 2043 accepts a utilization request, the utilization acceptance unit 2043 actuates the adaptation processing unit 2045.

The service acceptance unit 2044 stores, in a service information database 2063 of the storage unit 206, information on a service acquired from the service apparatus 400 via the information acquisition unit 2041. The information on the service can include the type of the service, a size required to provide the service, and a time period required to provide the service.

When actuated, the adaptation processing unit 2045 makes a parking space corresponding to a request for parking space utilization from the user apparatus 300 of a user and, if possible, allows provision of a service. The adaptation processing unit 2045 selects or identifies a parking space which meets a utilization request stored in the utilization information database 2062. If a parking space is designated in the utilization request, the adaptation processing unit 2045 identifies the designated parking space for the user. The adaptation processing unit 2045 also selects a parking space in accordance with, e.g., information on utilization hours in the utilization request. At the time of the parking space selection and the like, the parking information database 2061 is referred to. Note that, for a selected (or identified) parking space, a reservation is updated in the parking information database 2061.

The adaptation processing unit 2045 further provides information on services which are available besides parking in a parking space to the user apparatus 300 of a user, a utilization request being accepted by the apparatus. Among the services in the provided information, one may be selected in accordance with a utilization status or a reservation status of other parking spaces which are associated with a parking space in the utilization request described earlier or a parking space which meets the utilization request. Among provided pieces of service information, one may be selected in accordance with a past experience in service utilization of the user as a utilization applicant or another parking lot utilizer different from the user. Among provided pieces of service information, one may be selected in accordance with a time slot. At the time of the service selection, the parking information database 2061 and/or the service information database 2063 are (is) referred to. For example, the past experience in service utilization of the user as the utilization applicant or the other parking lot utilizer different from the user is also accumulated in the service information database 2063. The past experience in service utilization includes information on a time slot and is stored such that a time-slot-appropriate service (e.g., a service with an experience in being often utilized during a given time slot), or the like can be extracted in accordance with the time slot.

When the adaptation processing unit 2045 accepts a response conveying a request to utilize a service from the user apparatus 300, the adaptation processing unit 2045 selects (or identifies) a parking space and sends an instruction to provide a service to the service apparatus 400 so as to allow parking in the parking space and utilization of the service. Note that the adaptation processing unit 2045 refers to information in the parking information database 2061, the utilization information database 2062, and/or the service information database 2063 at the time of the series of processes and updates the information as needed.

The information provision unit 2046 executes provision, i.e., transmission of information to the user apparatus 300 and/or the service apparatus 400 by the adaptation processing unit 2045.

Figure 4:
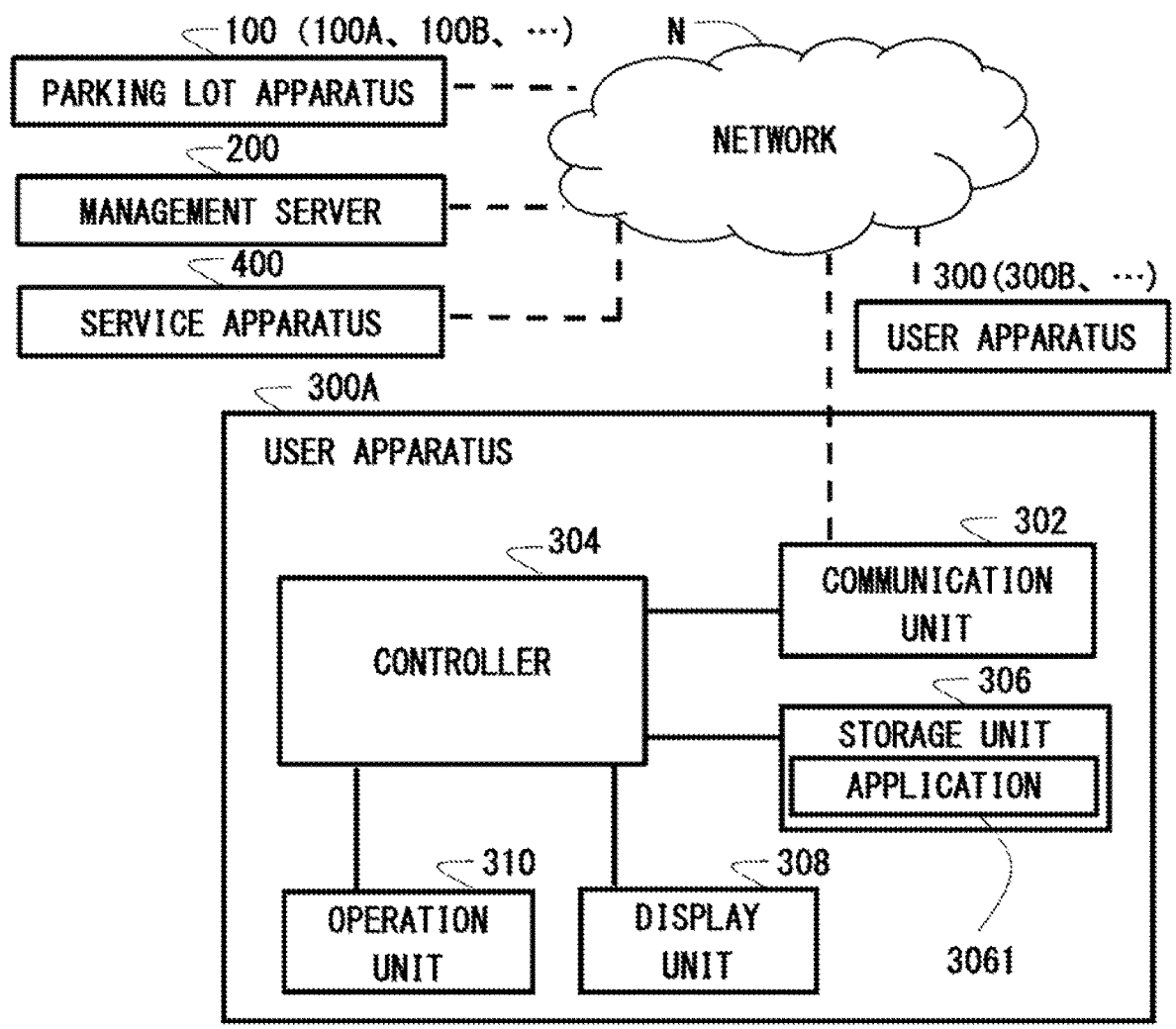
FIG. 4 is a block diagram schematically illustrating the configuration of the system in FIG. 1 and is a diagram particularly illustrating a configuration of a user apparatus.

The user apparatus 300 will be described with reference to FIG. 4. The user apparatus 300 is, for example, a mobile terminal, a smartphone, a personal computer, or the like. The user apparatus 300A in FIG. 4 as one example includes a communication unit 302, a controller 304, and a storage unit 306. The communication unit 302 and the storage unit 306 of the user apparatus 300A are the same as the communication unit 202 and the storage unit 206, respectively, of the management server 200. The user apparatus 300A also includes a display unit 308 and an operation unit 310. The display unit 308 is, for example, a liquid crystal display, an electroluminescence panel, or the like. The operation unit 310 may be, for example, a keyboard, a pointing device, or the like. More specifically, in the present embodiment, the operation unit 310 includes a touch panel and is substantially integrated with the display unit 308.

The controller 304 includes a CPU and a main storage unit like the controller 204 of the management server 200. The CPU of the controller 304 executes an application program (application) 3061 which is stored in the storage unit 306. The application 3061 is an application program for access to information distributed from a web browser, the parking lot apparatus 100, the management server 200, and the service apparatus 400. The application 3061 includes a GUI, accepts input from a user, and transmits the input to, for example, the management server 200 via the network N. The user can communicate directly with the parking lot apparatus 100 via the user apparatus 300A, transmit reservation information, and reserve a parking space in the parking lot P. The user can also communicate directly with the management server 200 via the user apparatus 300A, and transmit a utilization request of a vacant parking space or acquire information on a service and transmit a response. The user can communicate with the service apparatus 400 through the user apparatus 300 and be provided with a service.

Figure 5:
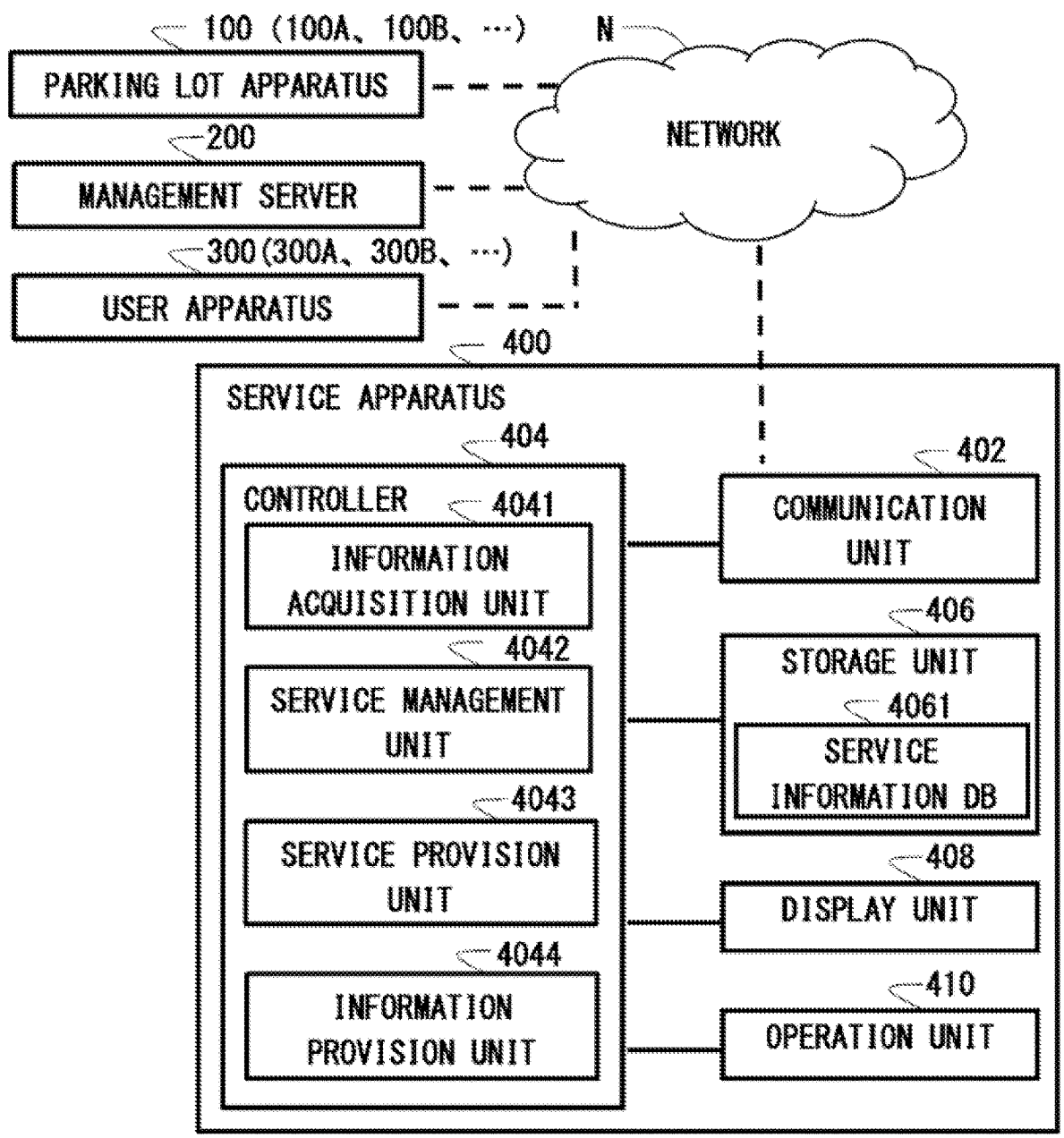
FIG. 5 is a block diagram schematically illustrating the configuration of the system in FIG. 1 and is a diagram particularly illustrating a configuration of a service apparatus.

The service apparatus 400 will be described with reference to FIG. 5. The service apparatus 400 is an information processing apparatus and is configured to include a communication unit 402, a controller 404, and a storage unit 406, as illustrated in FIG. 5. The communication unit 402 is the same as the communication unit 202 and includes a communication function for connecting the service apparatus 400 to the network N. The communication unit 402 of the service apparatus 400 is a communication interface for communication with each of the management server 200 and the user apparatus 300 via the network N. The controller 404 includes a CPU and a main storage unit like the controller 204, and executes an information process by a program. The CPU is, of course, a processor, and the main storage unit of the controller 404 is one example of a main memory. The CPU in the controller 404 executes a computer program which is executably developed in the main storage unit and provides various types of functions. The main storage unit in the controller 404 stores a computer program to be executed by the CPU and/or data and the like. The main storage unit in the controller 404 is a DRAM, an SRAM, a RCM, or the like.

The controller 404 is connected to the storage unit 406. The storage unit 406 is an external storage unit, is used as a storage area which assists the main storage unit of the controller 404, and stores a computer program to be executed by the CPU of the controller 404 and/or data and the like. The storage unit 406 is a hard disk drive, an SSD, or the like.

The controller 404 is means that is responsible for control of the service apparatus 400. The controller 404 includes, as functional modules, an information acquisition unit 4041, a service management unit 4042, a service provision unit 4043, and an information provision unit 4044, as illustrated in FIG. 5. The functional modules are each implemented when the programs (program) stored in the main storage unit and/or the storage unit 406 are (is) executed by the CPU of the controller 404.

The service apparatus 400 further includes a display unit 408 and an operation unit 410. The display unit 408 is, for example, a liquid crystal display, an electroluminescence panel, or the like. The operation unit 410 may be, for example, a keyboard, a pointing device, or the like. More specifically, in the present embodiment, the operation unit 410 includes a touch-panel and is substantially integrated with the display unit 408.

The information acquisition unit 4041 acquires information which is input through the operation unit 410 by a service provider viewing the display unit 408, particularly information on a service. The information acquisition unit 4041 transmits the acquired information on the service to the service management unit 4042.

The service management unit 4042 stores the information on the service in a service information database 4061 in the storage unit 406. The service information database 4061 corresponds to the above-described service information database 2063. Note that although the system S includes one service apparatus 400, when there are a plurality of service apparatuses 400, pieces of information on services from the plurality of service apparatuses 400 are stored in the service information database 2063. Note that information stored in the service information database 4061 includes, for example, information on services which can be provided by service providing vehicles SPA, SPB, and SPC in FIG. 1. The service providing vehicle SPA can provide a service to transport packages G1 and G2 and the like, and can carry, for example, a package or the like from a designated shop or delivery company, or the like. The service providing vehicle SPB is a vehicle which provides a laundry service and includes a washing apparatus which allows on-the-spot loading and washing of clothes here. The service providing vehicle SPC is a vehicle which provides a massage service and includes a bed and a pillow.

The service provision unit 4043 transmits information on a service stored in the service information database 4061 to the management server 200. When the service provision unit 4043 acquires, from the management server 200 via the information acquisition unit 4041, information that a service is determined to be provided, the service provision unit 4043 stores the information in the service information database 4061 and transmits the information to a corresponding service providing vehicle or the like. Note that the service providing vehicles SPA, SPB, and SPC are each a vehicle which a person to provide a service drives and moves. The service providing vehicles SPA, SPB, and SPC, however, may be vehicles capable of autonomous running.

The information provision unit 4044 performs provision of information from the service provision unit 4043 to the management server 200 and provision of information to a service providing vehicle or the like. At this time, the information provision unit 4044 may refer to addresses of the management server 200 and the user apparatus 300 stored in the storage unit 406.

A service in the management server 200 in the system S with the above-described configuration will be described below. A specific description will be given below on the basis of the example in FIG. 1. In the scene in FIG. 1, the vehicles CA, CB, CC, and CD are parked in the parking lot P1, and vehicles CE and CF are parked in the parking lot P2. Under this situation, a user R is thinking of parking a vehicle CR in the parking lot P (P1, P2, . . . ), and a user S is thinking of parking a vehicle CS in the parking lot P. The user R has a user apparatus 300R, and the user S has a user apparatus 300S.

Figure 6:
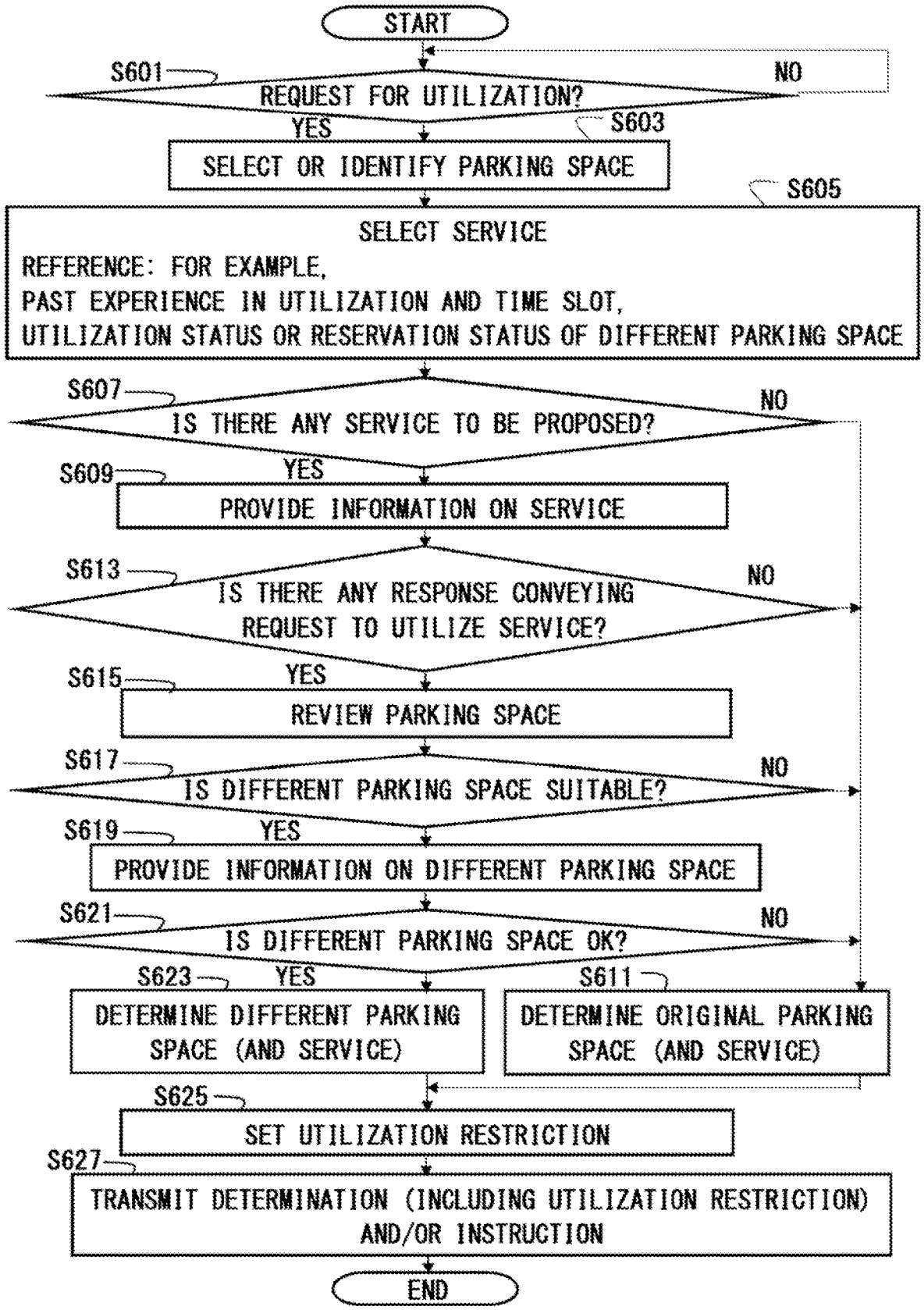
FIG. 6 is a flowchart of a controller of the management server in the system in FIG. 1.

An information process in the management server 200 in the system S with the above-described configuration will be described with reference to the flowchart in FIG. 6. A description will be given below on the assumptions that a user communicating mainly with the management server 200 is the user R and that communication by the user S is made during the communication by the user R.

The user R inputs a utilization request of a parking space for the vehicle CR from the user apparatus 300R and transmits the utilization request to the management server 200. As a result, the controller 204 of the management server 200 accepts the utilization request (step S601). The utilization request here includes information designating the parking space (X2,Y3) in the parking lot P1. Thus, the adaptation processing unit 2045 of the controller 204 identifies the parking space (X2,Y3) and executes updating of the parking information database 2061 so as to reserve the parking space (step S603). Note that the adaptation processing unit 2045 may select a parking space in the parking lot P1 or the parking lot P2 in accordance with a predetermined program.

The adaptation processing unit 2045 of the controller 204 then selects a service which is available besides parking in the parking space for the user apparatus 300R of the user R (step S605). In the selection, information in the parking information database 2061 and/or information in the service information database 2063 are (is) referred to, as described above. A service to be provided to the user apparatus 300R of the user R as a utilization applicant, the utilization request being accepted by the apparatus, is selected in accordance with, for example, a past experience in service utilization of each of the user R and/or another user, a utilization status or a reservation status of other parking spaces, and/or a time slot. As will be described later, the above-described three types of services that can be provided by the service providing vehicles SPA, SPB, and SPC are selected here. Note that, for example, each of the transport service of the service providing vehicle SPA and the laundry service of the service providing vehicle SPB can be provided as long as there is a parking space for one vehicle. Unlike this, it is desirable for the massage service of the service providing vehicle SPC that, for example, there be a parking space for two vehicles lined up behind each other. Information necessary for provision of the services is also stored in the service information database 2063.

Figure 7:
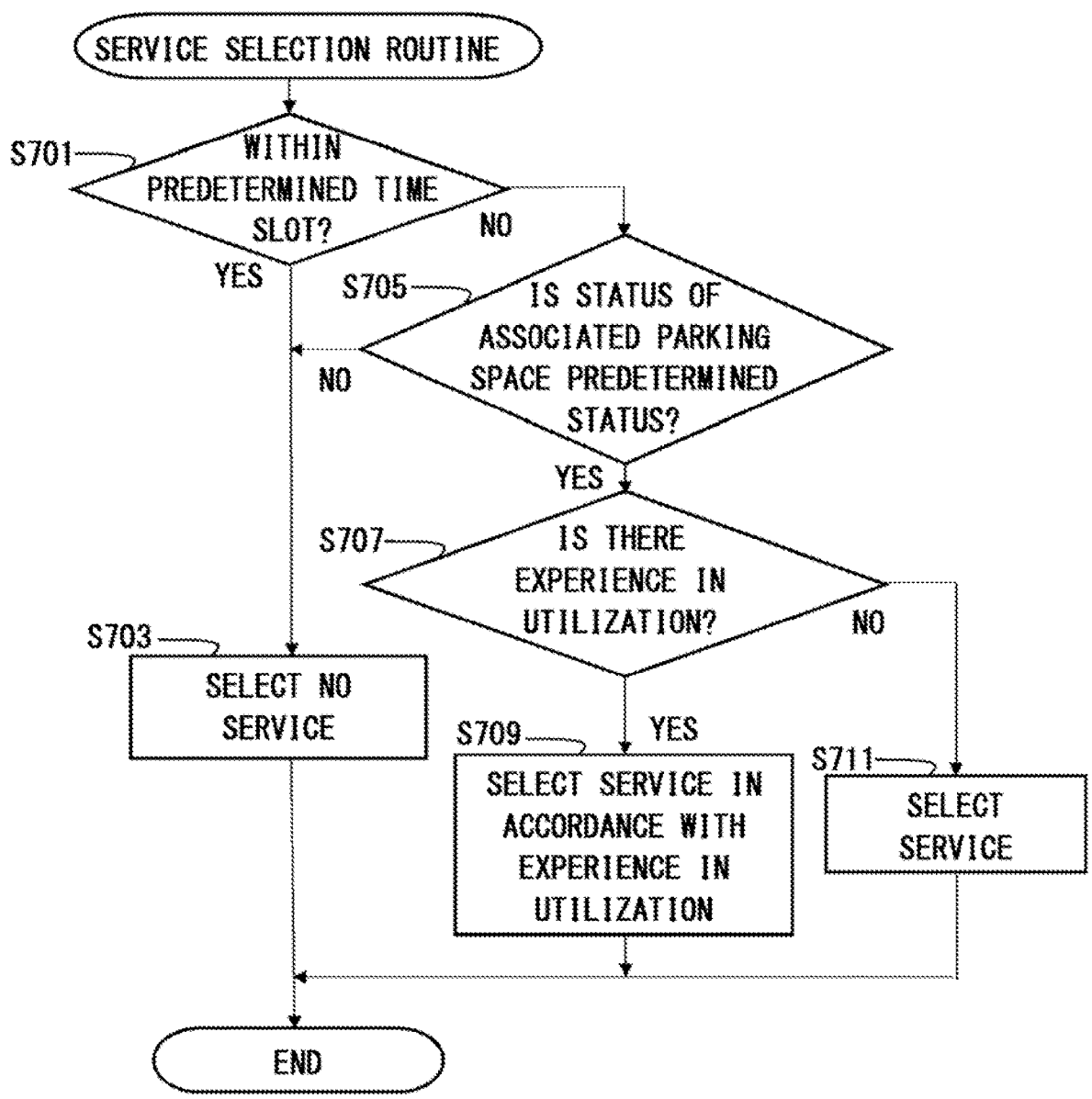
FIG. 7 is a flowchart for service selection of the controller of the management server in the system in FIG. 1.

The service selection (step S605) will be described with reference to the flowchart in FIG. 7. The adaptation processing unit 2045 first judges whether a time slot desired for parking space utilization is within a predetermined time slot (step S701). The time slot desired for parking space utilization can be obtained on the basis of, for example, a start date and time and a period desired for parking space utilization in information on a parking reservation. For example, when the parking lot P is a parking lot near a station (or an airport or the like), the parking lot P is often utilized simply as a parking lot during the predetermined time slot, such as a time slot with arrival and departure of trains, and the utilization is stored as a past experience in utilization of parking spaces in the parking lot P. For this reason, in the present embodiment, a vacant parking space is not utilized for service provision but is provided simply as a parking space during the time slot. That is, when the time slot desired for parking space utilization is within the predetermined time slot (YES in step S701), no service is selected (step S703).

On the other hand, when the time slot desired for parking space utilization is not within the predetermined time slot (NO in step S701), it is judged whether the utilization status or the reservation status of other parking spaces associated with the parking space (X2,Y3) identified in step S603 above is a predetermined status (step S705). Although another parking space associated is defined in the following manner here, the other parking space associated is not limited to this and can be arbitrarily set. Referring to the parking information database 2061, the adaptation processing unit 2045 recognizes that a parking space (X1,Y3), a parking space (X1,Y4), and a parking space (X2,Y4) around the parking space (X2,Y3) are vacant at this time (see FIG. 1). Since the number of vacancies in the parking lot P is not less than a predetermined number, the adaptation processing unit 2045 judges that the utilization status or the reservation status is the predetermined status (YES in step S705). As criteria for judging whether the number of vacant parking spaces is not less than the predetermined number, the requirement that two or more vacant parking spaces be present around the identified parking space and the requirement that there be vacant parking spaces in at least two directions in the parking lot P (P1 or P2) are stipulated here. For example, a parking space (R1,S5) in the parking lot P2 is a vacant parking space, and parking spaces (R1,S4), (R2,S4), and (R2,S5) which are adjacent to and are located in three directions from the parking space (R1,S5) as a center are vacant. This satisfies the requirement that there be vacant parking spaces in at least two directions in the parking lot P. Note that, when the utilization status or the reservation status is not the predetermined status (NO in step S705), the process advances to step S703 above.

If the utilization status or the reservation status is the predetermined status (YES in step S705), the adaptation processing unit 2045 judges whether there is a past experience in service utilization of the user R that is the utilization applicant or a user which is another parking lot utilizer different from the user R (step S707). For example, when a past experience in service utilization of the user R is stored, it is judged that there is a past experience in service utilization (YES in step S707). The same applies to a case where there is a past experience in service utilization of a user which is another parking lot utilizer different from the user R. Here, there is no past experience in service utilization of the user R, and a past experience in service utilization of another user is stored. Assume here that the past experience in service utilization of the other user includes the above-described three types of services that can be provided by the service providing vehicles SPA, SPB, and SPC, particularly during the time slot desired for parking space utilization. In this case, it is judged that there is an experience in utilization (YES in step S707). Note that a past experience in service utilization of the utilization applicant or the other parking lot utilizer different from the utilization applicant can be regarded as a track record for a predetermined period (e.g., a past month). The other parking lot utilizer may be limited to a particular person which is related to or identical in liking to the user R that is the utilization applicant. If the other parking lot utilizer is a person related to the user R, the other parking lot utilizer can be a family member, a friend, or the like and may be registered in advance.

If there is an experience in utilization (YES in step S707), service selection based on the experience in utilization is executed (step S709). For example, when the user R has a plurality of past experiences in service utilization, all of services corresponding to the past experiences may be selected. Alternatively, when the user R has a plurality of past experiences in service utilization, a service most utilized during the time slot desired for parking space utilization may be selected. A past experience in service utilization of the user R may be given the highest priority, and when the user R has no past experience in service utilization, a past experience in service utilization of the other user may be used. Here, the above-described three types of services that can be provided by the service providing vehicles SPA, SPB, and SPC are selected, as described above. Note that the number of types of services to be selected may be one. That is, in the process according to the present embodiment, data is clustered into, e.g., an experience in utilization of the utilization applicant itself, an experience in utilization of another utilizer which has a given particular relationship with the utilization applicant, and an experience in utilization of another utilizer which is unrelated to the utilization applicant, and priorities may be set. The service selection based on an experience in utilization may be performed in accordance with priorities given to such clustered pieces of data.

If there is no experience in utilization (NO in step S707), service selection is executed regardless of experience in utilization (step S711). For example, all of services which are available during the time slot desired for parking space utilization may be selected or an arbitrary one or ones of the services may be selected. For example, a service which is most utilized in the experience in utilization of the utilization applicant and/or the other parking lot utilizer among the services available during the tire slot desired for parking space utilization may be selected.

Since the time slot desired for parking space utilization is not within the predetermined time slot (NO in step S701), the utilization status or the reservation status is the predetermined status (YES in step S705), and there is an experience in utilization as described above (YES in step S707), service selection based on the experience in utilization is executed (step S709). The above-described three types of services that can be provided by the service providing vehicles SPA, SPB, and SPC are selected here.

Since the services can be selected (YES in step S607), the adaptation processing unit 2045 of the controller 204 transmits, i.e., provides information on the selected services to the user apparatus 300R of the user R (step S609). If the time slot desired for parking space utilization is within the predetermined time slot (YES in step S701), and no service is selected (step S703), there is no service to be proposed (NO in step S607). In this case, the adaptation processing unit 2045 of the controller 204 does not proceed with the process of providing a service to the user R any further and determines the identified parking space (X2,Y3) (a first parking space) described earlier as the parking space for the vehicle CR of the user R (step S611).

The user R can view provided information on a service via the user apparatus 300R, and can input a response conveying a request to utilize the service and transmit the response to the management server 200 when the user R requests to utilize the service. If the adaptation processing unit 2045 of the controller 204 accepts the response conveying the request to utilize the service within a predetermined time period after the transmission of the information on the services to the user apparatus 300R of the user R (YES in step S613), the adaptation processing unit 2045 performs a parking space review (step S615). Note that the service that the user R requests to utilize is the massage service of the service providing vehicle SPC here.

Here, the user S is finished with reservation of the parking space (X2,Y4) in the parking lot P1 (step S627 (to be described later)) before the response conveying the request to utilize the service is accepted from the user apparatus 300R. The parking space (X2,Y4) is thus already filled up. Hence, in the parking lot P1, there is no place to provide the massage service of the service providing vehicle SPC near the parking space (X2,Y3) (the first parking space) where the vehicle CR of the user R is to be parked.

For the above-described reason, the adaptation processing unit 2045 of the controller 204 performs a parking space review (step S615). The adaptation processing unit 2045 then selects a parking space in the parking lot P2 as a second parking space which is more suitable for the service to be utilized than the parking space (X2,Y3) (YES in step S617).

For example, the adaptation processing unit 2045 selects the parking space (R1,S5) in the parking lot P2 as the parking space for the vehicle CR of the user R and selects the parking spaces (R1,S4) and (R2,S4) in the parking lot P2 as a parking space for provision of the massage service. Note that the parking space for the vehicle CR of the user R is set near the parking space for the vehicle for service provision in order to inhibit movement by foot of the user in the parking lot and that a program based on this idea is stipulated and stored. Note that the parking space where the vehicle CR of the user R is to be parked is preferably in the parking lot P2 where the service providing vehicle is parked. However, at which one of a plurality of vacant spaces the vehicle CR of the user R is fixed may be decided on the basis of ease of car parking. The parking space where the vehicle CR is to be parked may be decided in accordance with a program which is built so as to avoid a situation where a state resulting from vehicle parking of a parking lot is a vermiculated state. The parking space for the service providing vehicle may be decided in accordance with the parking space where the vehicle CR of the user R is to be parked. The decision on the parking spaces is reflected in the parking information database 2061, and the reservation is updated. However, the reservation of the parking space (X2,Y3) made earlier is not cancelled at this time. The adaptation processing unit 2045 provides information on the selected parking space (R1,S5) in the parking lot P2 as the parking space for the vehicle CR to the user apparatus 300R of the user R (step S619).

As a result, when the adaptation processing unit 2045 of the controller 204 acquires, from the user apparatus 300R of the user R, a response to the effect that the other parking space (R1,S5) as a review result is fine (YES in step S621), the adaptation processing unit 2045 executes a process of determining the parking spaces (step S623). That is, a process of setting the parking space (R1,S5) as the parking space for the vehicle CR of the user R, causing the service providing vehicle SPC to park in the parking spaces (R1,S4) and (R2,S4), and providing the service to the user R is executed. At this time, the adaptation processing unit 2045 updates the parking information database 2061 so as to cancel the reservation of the parking space (X2,Y3) made earlier.

For example, when there is a parking space suitable for the massage service neither in the parking lot P1 nor in the parking lot P2 (NO in step S617), the process advances to step S611. The adaptation processing unit 2045 determines the identified parking space (X2,Y3) described earlier as the parking space for the vehicle CR of the user R. If there is a parking space suitable for the massage service in the parking lot P2, but there is no parking space suitable for parking of the vehicle CR in the parking lot P2 (NO in step S617), the process advances to step S611 described earlier. At this time, as described earlier, the identified parking space (X2,Y3) is determined as the parking space for the vehicle CR of the user R, and the massage service in the parking spaces (R1,S4) and (R2,S4) in the parking lot P2 away from the parking lot P1 is determined to be provided.

If the adaptation processing unit 2045 fails to acquire, from the user apparatus 300R of the user R, a response to the effect that the other parking space (R1,S5) as the review result is fine, for example, within a predetermined time period (NO in step S621), the adaptation processing unit 2045 executes processing accordingly. In this case, the process advances to step S611, and a process of parking the service providing vehicle SPC in the parking spaces (R1,S4) and (R2,S4) and parking the vehicle CR in the parking space (X2,Y3) in the parking lot P1 is determined to be performed.

For example, when the service that the user R requests to utilize is the transport service of the service providing vehicle SPA, the vehicle CR may be parked at a recognizable position in the parking lot P, and the transport service of the service providing vehicle SPA may be provided to the user R. In the case of the transport service, the parking space for the vehicle CR may be fixed at a parking space facing the road ST in the parking lot P (e.g., the parking space (R1,S1) in the parking lot P2). In the case of such a transport service, a parking lot itself to which a selected parking space belongs may be located at a recognizable place in terms of convenience. As described above, a parking space may be selected in accordance with a service.

When the parking space or a combination of the parking space and the service is determined via step S611 or step S623 in the above-described manner, a utilization restriction is set (step S625). For example, assume a case where the parking space (R1,S5) is determined as the parking space for the vehicle CR of the user R and the parking spaces (R1,S4) and (R2,S4) are determined as a parking space for provision of the massage service to the user R. In this case, it is safer for a path of the vehicle CR of the user R and a path of the service providing vehicle SPC to the parking spaces (R1,S4) and (R2,S4) not to cross each other. The path of the service providing vehicle SPC to the parking space (see an arrow A2 in FIG. 1) is restricted to one on the opposite side of the parking lot P2 from the parking lot P1, and the path of the vehicle CR to the parking space (see an arrow A1 in FIG. 1) is restricted to one on a side closer to the parking lot P1 of the parking lot P2. The restrictions are stipulated as predetermined utilization restrictions in accordance with a predetermined program. The provision of the restrictions is particularly effective when the service providing vehicle SPC is an unattended vehicle. The predetermined utilization restrictions may be applied so as to suppress mutual interference between parking space utilization by a first utilization applicant which utilizes only parking and parking space utilization by a second utilization applicant which utilizes both parking and a service. This is because the first utilization applicant is expected not to assume entry of the service providing vehicle SPC by the second utilization applicant, and safety effects can be expected. The predetermined utilization restrictions may be applied to at least either one of the first and second utilization applicants, i.e., a user.

Consider here a case with parking space utilization by the first utilization applicant that utilizes only parking and parking space utilization by the second utilization applicant that utilizes both parking and a service. For example, at the time of parking the vehicle CR in the parking space (R1,S5) in the same parking lot P2, the user R as the second utilization applicant can move more in the parking lot P2 in order to be provided with the service, as described above. Assume that a user E as the first utilization applicant parks the vehicle CE in a parking space (R1,S3) in the parking lot P2 illustrated in FIG. 1 at this time. In this case, it is desirable to ensure the safety of movement in the parking lot of the user R and more reliably ensure safe driving of the vehicle CE by the user E. For this reason, the parking of the vehicle CR by the user R and the parking of the vehicle CE by the user E are restricted to front-end parking (parking that pulls a vehicle into a parking space head first). This restriction is stipulated in advance by a program and is set as a utilization restriction. Note that the adaptation processing unit 2045 can recognize presence of the parking space utilization by the first utilization applicant that utilizes only parking and the parking space utilization by the second utilization applicant that utilizes both parking and the service. This is because the adaptation processing unit 2045 only needs to refer to the parking information database 2061 and/or the service information database 2063.

The controller 204 of the management server 200 transmits information on determination of the parking space or information on determination of the parking space and service provision to the user apparatus 300R of the user R and/or the service apparatus 400 (step S627). If information on the predetermined utilization restrictions is provided in step S625, these pieces of determination information include the information on the utilization restrictions. The process in step S627 is one example of notification of the predetermined utilization restrictions.

As has been described above, through processing by the controller 204 of the management server 200 in the system S, provision of information on a service which is available besides parking in a parking space to a user apparatus which has accepted a utilization request of the parking space is executed. Acceptance of a response conveying a request to utilize the service from the user apparatus is executed. A parking space review and/or a process of determining provision of the service and the like are (is) executed. As a result, it is possible to more effectively exploit a vacant parking space in a parking lot by further providing a service.

The above-described embodiment is merely illustrative, and the present disclosure can be properly changed and carried out without departing from the scope thereof. Processes and/or means described in the present disclosure can be partly extracted and carried out or can be freely combined and carried out as long as there is no technical discrepancy.

In the embodiment, in steps S701 to S703, a process of selecting no service is executed when a time slot desired for parking space utilization is within the predetermined time slot. On the other hand, when the time slot desired for parking space utilization is not within the predetermined time slot, it is judged in step S705 whether the utilization status or the reservation status is the predetermined status. A service for each time slot may be selected instead of the process when the time slot desired for parking space utilization is not within the predetermined time slot.

For example, assume that the predetermined time slot is a combination of from 11 a.m. to 2 p.m. and from 5 p.m. to 6 p.m. In this case, time slots may be set as divided time slots, such as ones from 0 a.m. to 7 a.m., from 7 a.m. to 11 a.m., from 2 p.m. to 5 p.m., from 6 p.m. to 9 p.m., and from 9 p.m. to 12 p.m. The adaptation processing unit 2045 may execute the processes in step S705 to S711 for each time slot. Note that a service to be selected may be based on information collected from questionnaires and the like in addition to an experience of a utilization applicant. This makes it possible to perform, for example, a service by an autonomous running vehicle for a snack selling service, a vehicle equipped with an automatic vending machine, or the like during the time slot from 7 a.m. to 11 a.m.

Note that a utilization applicant is not limited to a person which parks a vehicle of the utilization applicant in a parking lot. That is, a utilization applicant is not limited to an owner of the vehicle or a driver of the vehicle. That is, the system S according to the present embodiment can also provide a parking lot and a service to a user which comes to a parking lot without use of a vehicle or a fellow passenger other than a driver. Even a user which comes to a parking lot without vehicle utilization may be made able to make a utilization request in accordance with the process in step S601. In this case, the user may select an available service in a parking space in the parking lot and be provided with the service. This allows a user without a vehicle to be provided with a massage, food and drink, a resting space, or the like. For example, during the time slot from 2 p.m. to 5 p.m., a place for an afternoon nap is provided by a self-driving vehicle. From 6 p.m. to 12 p.m., a pickup and drop-off service is performed. During the time slot from 0 a.m. to 7 a.m., a self-driving vehicle serving as a lodging and a self-driving vehicle for transfer to and from a lodging are provided. Thus, one or a plurality of parking spaces in a parking lot can be utilized as a temporary pickup car loading zone. A taxi company may set a part of the parking lot as a temporary taxi stand. In terms of a fee for parking lot utilization involved in a pickup and drop-off service, for example, a vendor which provides the pickup and drop-off service, a lodging facility serving as a goal of the pickup and drop-off service, or the like may bear at least part of the fee.

A process described as being performed by one apparatus may be shared and executed by a plurality of apparatuses. For example, the management server 200 that is an information processing apparatus need not be one computer and may be configured as a system including a plurality of computers. Alternatively, a process described as being performed by other apparatuses may be executed by one apparatus. For example, a part or the whole of the processing by the parking lot apparatus described above may be executed by the management server. The parking lot apparatus may be integrated with the management server. In this case, an installation position of the management server may be at any location, such as in a parking lot or on a cloud. By which hardware configuration functions are implemented in a computer system can be flexibly changed.

The present disclosure can also be implemented by supplying a computer program including the functions described in the above-described embodiment to a computer and reading out and executing the program by one or more processors of the computer. This computer program may be provided to the computer as a non-transitory computer-readable storage medium connectable to a system bus of the computer or may be provided to the computer via a network. Examples of the non-transitory computer-readable storage medium include any type of disk, such as a magnetic disk (e.g., a floppy (registered trademark) disk or a hard disk drive (HDD)) or an optical disc (e.g., a CD-RCM, a DVD, or a Blu-ray Disc), a read only memory (RCM), a random access memory (RAM), an EPROM, an EEPROM, a magnetic card, a flash memory, an optical card, and any type of medium suitable for storing electronic instructions.

What is claimed is:

1. An information processing apparatus comprising
a controller comprising at least one processor configured to perform:
accepting a utilization request of a parking space from an apparatus of a utilization applicant;
providing information on a service that is available besides parking in the parking space to the apparatus of the utilization applicant, the utilization request being accepted by the apparatus; and
accepting a response conveying a request to utilize the service from the apparatus of the utilization applicant, wherein
the controller further performs
selecting the information on the service to be provided to the apparatus of the utilization applicant, the utilization request being accepted by the apparatus, in accordance with a past experience in service utilization of the utilization applicant or a past experience in service utilization of a person different from the utilization applicant.

2. The information processing apparatus according to claim 1, wherein
the controller further performs
selecting the information on the service to be provided to the apparatus of the utilization applicant, the utilization request being accepted by the apparatus, in accordance with a utilization status of another parking space associated with the parking space or a reservation status of the other parking space.

3. The information processing apparatus according to claim 1, wherein
the controller further performs
selecting the information on the service to be provided to the apparatus of the utilization applicant, the utilization request being accepted by the apparatus, in accordance with a time slot desired for parking space utilization by the utilization applicant.

4. The information processing apparatus according to claim 1, wherein
the controller further performs
providing information on a second parking space to the apparatus of the utilization applicant, when the response conveying the request to utilize the service is accepted, and there is the second parking space more suitable for the service, utilization of the service being requested, than the parking space.

5. The information processing apparatus according to claim 1, wherein
the controller further performs
instructing an apparatus of a provider that provides the service, for which the response is accepted, to provide the service to the utilization applicant.

6. The information processing apparatus according to claim 1, wherein
the controller further performs
accepting information on the service from an apparatus of a provider that provides a service available in a parking space, and storing the information in a memory.

7. The information processing apparatus according to claim 1, wherein
the controller further performs
notifying at least either one of an apparatus of a first applicant and an apparatus of a second applicant of a predetermined utilization restriction so as to suppress mutual interference between utilization of a first parking space by the first applicant and utilization of a second parking space different from the first parking space by the second applicant, when there are the first applicant that desires to utilize only a parking space and the second applicant that desires to utilize both a parking space and a service available in the parking space.

8. An information processing method,
wherein at least one computer performs
accepting a utilization request of a parking space from an apparatus of a utilization applicant,
providing information on a service that is available besides parking in the parking space to the apparatus of the utilization applicant, the utilization request being accepted by the apparatus, and
accepting a response conveying a request to utilize the service from the apparatus of the utilization applicant, wherein
the at least one computer further performs
selecting the information on the service to be provided to the apparatus of the utilization applicant, the utilization request being accepted by the apparatus, in accordance with a past experience in service utilization of the utilization applicant or a past experience in service utilization of a person different from the utilization applicant.

9. The information processing method according to claim 8, wherein
the at least one computer further performs
selecting the information on the service to be provided to the apparatus of the utilization applicant, the utilization request being accepted by the apparatus, in accordance with a utilization status of another parking space associated with the parking space or a reservation status of the other parking space.

10. The information processing method according to claim 8, wherein
the at least one computer further performs
selecting the information on the service to be provided to the apparatus of the utilization applicant, the utilization request being accepted by the apparatus, in accordance with a time slot desired for parking space utilization by the utilization applicant.

11. The information processing method according to claim 8, wherein
the at least one computer further performs
providing information on a second parking space to the apparatus of the utilization applicant, when the response conveying the request to utilize the service is accepted, and there is the second parking space more suitable for the service, utilization of the service being requested for, than the parking space.

12. The information processing method according to claim 8, wherein
the at least one computer further performs
instructing an apparatus of a provider that provides the service, for which the response is accepted, to provide the service to the utilization applicant.

13. The information processing method according to claim 8, wherein
the at least one computer further performs
accepting information on the service from an apparatus of a provider that provides a service available in a parking space, and storing the information in a memory.

14. The information processing method according to claim 8, wherein
the at least one computer further performs
notifying at least either one of an apparatus of a first utilization applicant and an apparatus of a second utilization applicant of a predetermined utilization restriction so as to suppress mutual interference between utilization of a first parking space by the first utilization applicant and utilization of a second parking space different from the first parking space by the second utilization applicant, when there are the first utilization applicant that desires to utilize only a parking space and the second utilization applicant that desires to utilize both a parking space and a service available in the parking space.

15. A system comprising an information processing apparatus configured to be capable of communication with an apparatus of a utilization applicant that desires to utilize a parking space and an apparatus of a provider that provides a service available in the parking space,
wherein a controller of the information processing apparatus comprising at least one processor configured to perform
accepting a utilization request of a parking space from the apparatus of the utilization applicant,
providing information on a service that is available besides parking in the parking space to the apparatus of the utilization applicant, the utilization request being accepted by the apparatus,
accepting a response conveying a request to utilize the service from the apparatus of the utilization applicant, and
instructing the apparatus of the provider to provide the service to the utilization applicant wherein
the controller further performs
selecting the information on the service to be provided to the apparatus of the utilization applicant, the utilization request being accepted by the apparatus, in accordance with a utilization status of another parking space associated with the parking space or a reservation status of the other parking space, a past experience in service utilization of the utilization applicant or a past experience in service utilization of a person different from the utilization applicant, or a time slot desired for parking space utilization by the utilization applicant.

16. The system according to claim 15, wherein
the controller further performs
providing information on a second parking space to the apparatus of the utilization applicant, when the response conveying the request to utilize the service is accepted, and there is the second parking space more suitable for the service, utilization of the service being requested for, than the parking space.

17. The system according to claim 15, wherein
the controller further performs
accepting the information on the service from the apparatus of the provider, and storing the information in a memory.

* * * * *